United States Patent [19]
Proffitt

[11] Patent Number: 4,616,169
[45] Date of Patent: Oct. 7, 1986

[54] BATTERY-POWERED APPLIANCE

[75] Inventor: Richard V. Proffitt, Essex, Conn.

[73] Assignee: Scovill Inc., Waterbury, Conn.

[21] Appl. No.: 720,868

[22] Filed: Apr. 8, 1985

[51] Int. Cl.$^4$ .......................... H02J 7/00; H01M 45/00
[52] U.S. Cl. .................................... 320/2; 30/DIG. 1;
310/50; 429/163
[58] Field of Search ............................ 320/2; 310/50;
30/DIG. 1; 15/DIG. 1; 429/96, 163

[56] References Cited
U.S. PATENT DOCUMENTS

| | | | |
|---|---|---|---|
| 3,533,119 | 10/1970 | Dokos | 320/2 X |
| 3,757,194 | 9/1973 | Weber et al. | 320/2 |
| 3,883,789 | 5/1975 | Achenbach et al. | 320/2 |
| 3,999,110 | 12/1976 | Ramstrom et al. | 320/2 |
| 4,050,003 | 9/1977 | Owings et al. | 320/2 |
| 4,084,123 | 4/1978 | Lineback et al. | 320/2 |

Primary Examiner—R. J. Hickey
Attorney, Agent, or Firm—Dallett Hoopes

[57] ABSTRACT

Appliance has housing with removable battery-pack section having a front end shaped to slide dovetail fashion up into the appliance housing and a spring-biased latch which holds up the rear of the section. Sets of contacts for discharge and charging have parallel contacts directed in the direction of the installing movement of the section into the housing.

4 Claims, 8 Drawing Figures

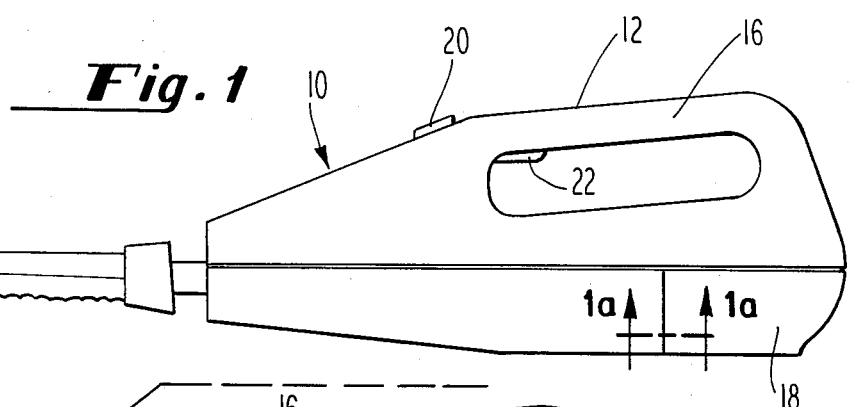
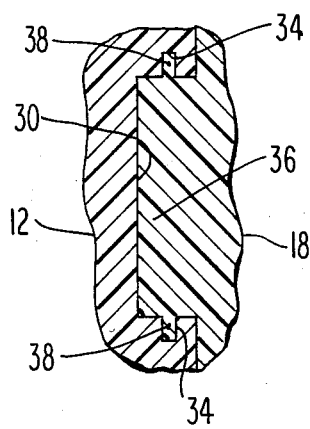
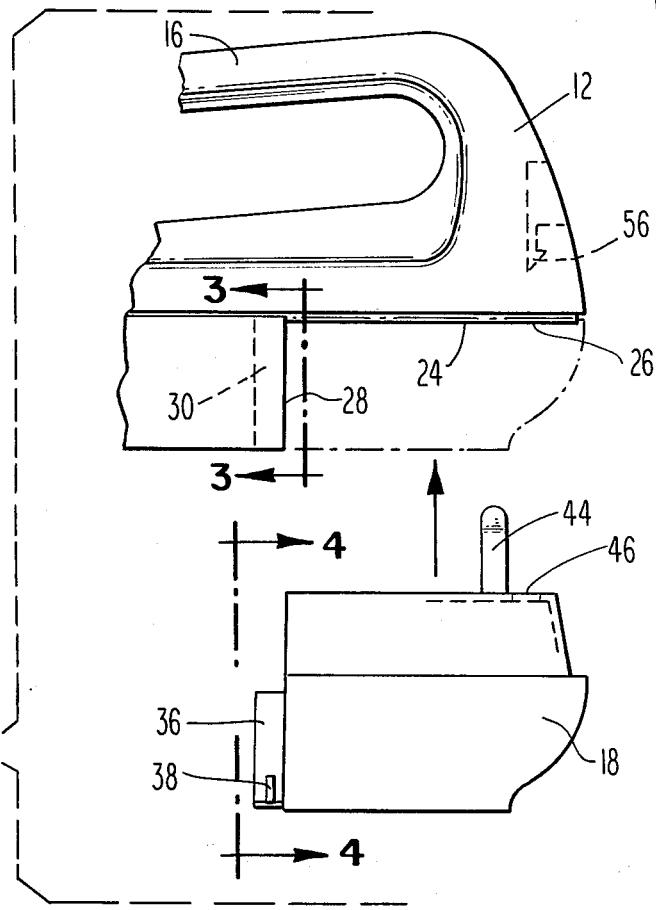
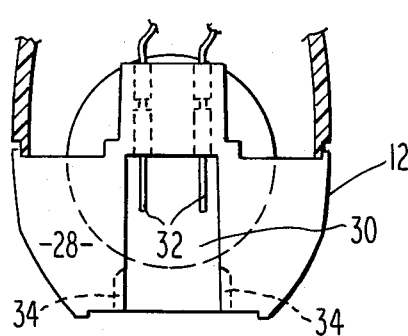
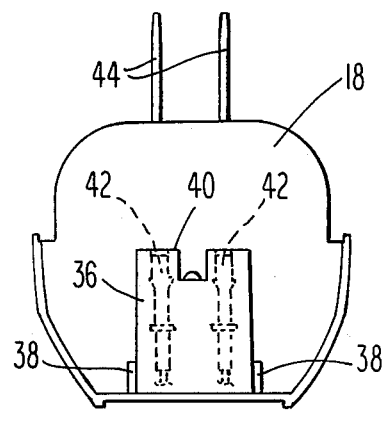

BATTERY-POWERED APPLIANCE

BACKGROUND OF THE INVENTION

1. Field of the Invention

This invention relates to a battery-powered appliance. More specifically, this invention relates to an appliance in which a battery pack supplying the power may be removed from the appliance and plugged into a conventional AC wall receptacle for charging.

2. Description of the Prior Art

In the prior art there have been attempts to provide appliances such as electrical razors with removable battery packs which have been chargeable by plugging them into wall receptacles. An example is disclosed in Fleckenstein et al, U.S. Pat. No. 3,281,636 issued Oct. 25, 1963. One of the problems with earlier such appliances is that the attachment between the body of the appliance and the battery pack has been dependent on the frictional engagement of the electric contacts of the appliance and battery pack themselves so that over time and with wear, the securement of the two parts together has become loose and unreliable.

In U.S. Pat. No. 3,757,194 which issued Sept. 4, 1973 to Weber et al a battery-pack section was slid into its place in the appliance housing. This unit was not provided with separate sets of contacts for discharging into the appliance and for insertion into a wall plug for charging, however.

The more recent U.S. Pat. No. 4,084,123 which issued Apr. 11, 1978 to Lineback et al provides a battery charger having a single set of contacts which may be used both for charging and discharging into the appliance, but some such earlier units have required an expensive conversion switch and complicated circuitry.

SUMMARY OF THE INVENTION

Under the present invention, the battery-pack circuit is kept simple by virtue of separate sets of contacts for charging the battery pack and discharging the pack into the appliance. These sets of contacts are parallel to each other, with the result that the vertical sliding of the pack into its place in either the appliance or the AC wall plug does not involve the structural interference of the sets of contacts with each other. Moreover, this vertical sliding into the appliance is made secure by a tongue-and-groove interfit between parts at one end of the battery pack and a secure spring-latching mechanism at the other end.

BRIEF DESCRIPTION OF THE DRAWINGS

Other benefits and features of the invention will be apparent from a reading of the following specification and examination of the attached drawings, all of which disclose a non-limiting embodiment of the invention. In the drawings:

FIG. 1 is a side elevational view of an appliance embodying the invention;

FIG. 1a is a fragmentary sectional view taken on the line 1a—1a of FIG. 1;

FIG. 2 is a fragmentary enlarged view showing in solid lines the battery pack removed and in phantom lines the battery pack in place;

FIG. 3 is a fragmentary sectional view taken on the line 3—3 of FIG. 2;

FIG. 4 is a sectional view taken on the line 4—4 of FIG. 2;

DETAILED DESCRIPTION OF THE PREFERRED EMBODIMENT

Figure 5:
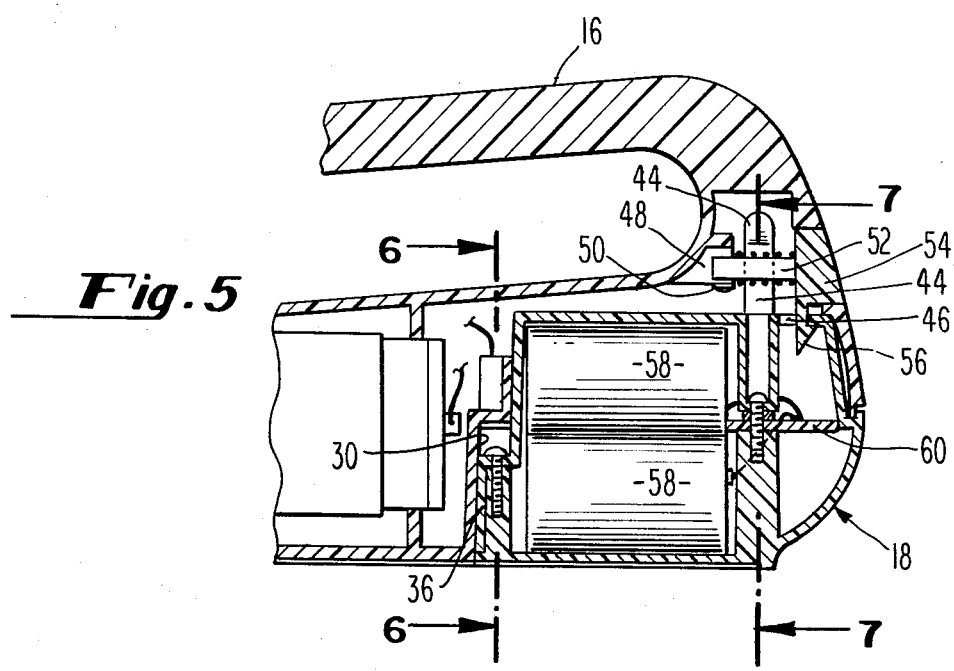
FIG. 5 is a fragmentary enlarged view of the rear end of the appliance showing the battery pack installed on the appliance.
Figures 6, 7:
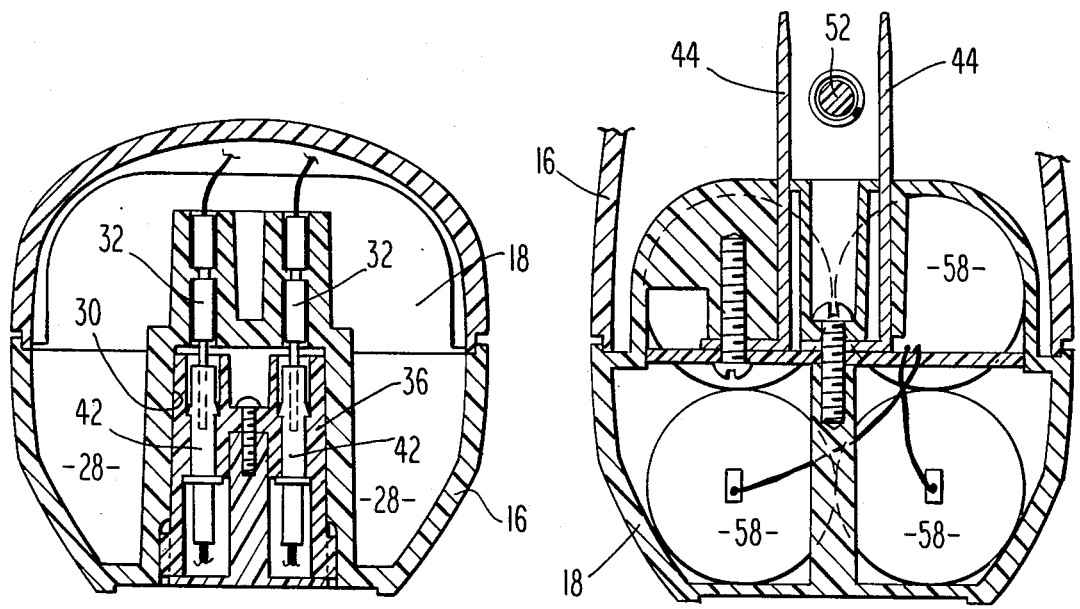
FIG. 6 is an enlarged sectional view takeon on the line 6—6 of FIG. 5.
FIG. 7 is an enlarged sectional view taken on the line 7—7 of FIG. 2.

Referring more specifically to the drawings, an electric carving knife emodying the invention is generally designated 10 in FIG. 1. It comprises a smooth housing 12 having an opening in the front end receiving the dual recipricoble blades 14 of the conventional sort.

The housing 12 includes a handle portion 16 and a lower removable section 18. An operating button 20 is provided within a thumb's reach of the handle, and a safety block button 22 is provided as disclosed in U.S. Pat. No. 3,358,108 which issued Dec. 12, 1967 to Hanson. The main section of the housing 12 encloses the knife-operating motor and the removable section 18 encloses a rechargeable battery pack.

With the removable section 18 removed, there is created recess 24 having a horizontal margin 26 and a vertical wall 28 (FIG. 2). The vertical wall 28 is formed with a vertical cavity 30 (FIG. 3). At the upper end of the cavity, bare motor contacts 32 extend downward. The sidewalls of the cavity are formed with partial grooves 34. The contacts 32 are connected directly to the motor through the switch button 20 in a conventional manner.

The removable section 18 (FIG. 4) is formed with a vertical projection 36 adapted to fit into the recess 30 and having ridges 38 on its opposite vertical sidewalls. The upper end 40 of the projection is provided with female contacts 42. Exending upwardly from the removable section 18 are the AC charge contacts 44 adapted to be inserted for charging (FIG. 2) into a conventional wall receptacle. The upper surface of the section 18 is formed adjacent its rearward end with a latch opening 46 (FIGS. 2, 5). The interior of the main section 16 of the housing is formed with a trough-shaped boss 48 which is closed on its lower end by a strap 50, the trough and the strap defining an opening for the stem 52 of a plunger-like latch having a head 54 with a downward latching finger 56.

The sectional view 5 shows that the removable section 18 includes batteries 58. These are connected appropriately through a printed circuit board 60, mounted in the section 18 and connected to both the female discharge contacts 42 and the AC charging plugs 44.

In use, the removable section 18 may be removed from the rest of the knife and the partial contacts 44 inserted in the conventional wall receptacle for charging. After a suitable time, the removable section 18 may be reinstalled in the knife by placing the projection 36 in alignment with the cavity 30 and vertically raising the section 18 so that the ribs 38 fit into the grooves 34 and the latching finger 56 snaps into the opening 46 in the removable section. This securely holds the section in a manner not disclosed in the art.

While the invention has been shown in only one form, it is not so limited, but may take many forms as defined by the following claim language.

I claim:

1. A battery-powered handheld appliance having a smooth housing, a lower section of the housing enclosing rechargeable battery-pack means, the lower section being removable to leave a recess having a vertical and a horizontal wall, motor means for driving an appliance disposed in the housing spaced from the said lower section, vertically extending and engaging interconnecting electrical means in the removable section and the housing adjacent the recess and releaseably connecting the battery-pack means and the motor, the rear of the housing above the recess including manually operable latch means, the removable section having a front vertical wall with a forward vertical projection having first interfitting means on the sides thereof, the vertical wall of the recess having a vertical cavity complementing the vertical projection, the cavity having second interfitting means in its side walls to accommodate slidingly the first interfitting means, and latch-engaging means at the rear end of the lower battery pack containing removable section, the latch and the interfitting means in cooperation keeping the removable section stored snugly up in the recess.

2. A battery-powered appliance as claimed in claim 1 wherein the latch is a plunger element having a stem mounted in a base in the housing and including a hook latchingly extending into an opening in the top of the removable section and an operator button in an opening in rear end surface of the housing and having an end surface flush with the surface of the housing.

3. A battery-powered appliance as claimed in claim 2 wherein in addition to the interconnecting electric means the removable section includes a pair of upwardly directed spaced battery-charging contacts, which when the removable section is stored in the recess extend up into the housing in the space above the section, the battery-charging contacts being on either side of the plunger stem.

4. A battery-powered appliance as explained in claim 1 wherein the first interfitting means are outward ribs and the second interfitting means are grooves.

* * * * *